(12) United States Patent
Kamoi

(10) Patent No.: US 12,418,597 B2
(45) Date of Patent: Sep. 16, 2025

(54) NETWORK DEVICE AND PROCESSING METHOD FOR NETWORK DEVICE FOR AGGREGATING COMMUNICATIONS

(71) Applicant: CANON KABUSHIKI KAISHA, Tokyo (JP)

(72) Inventor: Keiko Kamoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 18/512,561

(22) Filed: Nov. 17, 2023

(65) Prior Publication Data

US 2024/0171651 A1   May 23, 2024

(30) Foreign Application Priority Data

Nov. 18, 2022   (JP) ................................. 2022-184780

(51) Int. Cl.
*G06F 15/16* (2006.01)
*H04L 67/56* (2022.01)
(52) U.S. Cl.
CPC .................................... *H04L 67/56* (2022.05)
(58) Field of Classification Search
CPC ....................................................... H04L 67/56
USPC ......................................................... 709/203
See application file for complete search history.

(56) References Cited

U.S. PATENT DOCUMENTS

| | | | | |
|---|---|---|---|---|
| 6,513,061 B1 * | 1/2003 | Ebata | .................. | H04L 67/1021 709/224 |
| 6,597,469 B1 * | 7/2003 | Kuroyanagi | ....... | H04N 1/00832 358/1.14 |
| 7,594,040 B2 * | 9/2009 | Oshima | .................. | H04L 12/281 710/1 |
| 7,917,632 B2 * | 3/2011 | Lee | .......................... | H04L 67/59 709/227 |
| 8,219,610 B2 * | 7/2012 | Oikawa | ................... | H04L 65/80 709/203 |
| 8,230,492 B2 * | 7/2012 | Wada | ....................... | H04L 67/51 713/153 |
| 8,289,547 B2 * | 10/2012 | Ooba | ..................... | H04L 67/125 358/1.9 |
| 8,291,071 B2 * | 10/2012 | Kaneko | ................... | H04L 67/51 709/224 |
| 8,381,111 B2 * | 2/2013 | Kawana | ............. | H04N 1/00344 715/740 |
| 8,488,161 B2 * | 7/2013 | Sunata | .................. | G06F 3/1273 399/9 |

(Continued)

FOREIGN PATENT DOCUMENTS

JP    2018136876 A    8/2018

*Primary Examiner* — Alicia Baturay
(74) *Attorney, Agent, or Firm* — Canon U.S.A., Inc. IP Division

(57) ABSTRACT

A network device includes one or more memories and one or more processors. The one or more processors and the one or more memories are configured to obtain proxy information set to the network device, and communicate with a management server via a proxy server using the proxy information in a case where an aggregation mode is enabled and the proxy information is information received from the proxy server or in a case where the aggregation mode is not enabled, and not to communicate with the management server in a case where the aggregation mode is enabled and the proxy information is not the information received from the proxy server.

7 Claims, 14 Drawing Sheets

(56) References Cited

U.S. PATENT DOCUMENTS

| | | | | |
|---|---|---|---|---|
| 8,549,157 B2* | 10/2013 | Schnellbaecher | ... | H04L 63/0884 |
| | | | | 709/229 |
| 8,610,918 B2* | 12/2013 | Kaneko | ... | H04N 1/00344 |
| | | | | 358/1.14 |
| 8,938,326 B1* | 1/2015 | Fanara | ... | B61L 15/0027 |
| | | | | 701/19 |
| 9,098,178 B2* | 8/2015 | Kitamura | ... | G06F 3/048 |
| 9,203,931 B1* | 12/2015 | Ngo | ... | H04L 67/02 |
| 9,350,615 B2* | 5/2016 | Lee | ... | H04L 41/046 |
| 9,537,942 B2* | 1/2017 | Kubota | ... | H04L 67/1036 |
| 10,108,378 B2* | 10/2018 | Ishizu | ... | G06Q 10/06311 |
| 10,491,461 B2* | 11/2019 | Kurahashi | ... | G06F 13/00 |
| 12,225,097 B2* | 2/2025 | Baba | ... | H04L 67/56 |
| 2007/0288705 A1* | 12/2007 | Sunata | ... | H04L 12/66 |
| | | | | 711/154 |
| 2008/0106766 A1* | 5/2008 | Nakamoto | ... | H04N 1/32502 |
| | | | | 358/406 |
| 2009/0013398 A1* | 1/2009 | Cookmeyer | ... | H04L 43/10 |
| | | | | 726/11 |
| 2009/0147301 A1* | 6/2009 | Lee | ... | G06F 3/127 |
| | | | | 358/1.15 |
| 2015/0150077 A1* | 5/2015 | Daimon | ... | H04L 51/00 |
| | | | | 726/1 |
| 2016/0105307 A1* | 4/2016 | Kujirai | ... | H04L 41/0213 |
| | | | | 709/226 |
| 2020/0205058 A1* | 6/2020 | Yoshikawa | ... | H04W 48/08 |
| 2021/0250226 A1* | 8/2021 | Nagashima | ... | H04L 67/56 |
| 2023/0291643 A1* | 9/2023 | Baba | ... | H04L 67/56 |
| 2023/0315441 A1* | 10/2023 | Yoshioka | ... | G06F 21/10 |
| 2023/0362049 A1* | 11/2023 | Kumahashi | ... | H04L 41/5009 |
| 2024/0129333 A1* | 4/2024 | Minetomo | ... | H04L 63/1433 |
| 2024/0171585 A1* | 5/2024 | Yoshioka | ... | H04L 63/0876 |
| 2025/0030780 A1* | 1/2025 | Nakazawa | ... | H04L 67/562 |

* cited by examiner

FIG. 8A

`<instructionId>001</instructionId>` — 801

```
<id>001</id>
<Time>2021/05/01 00:00</Time>
<!--SETTING DATA IMPORT PROCESSING-->
<importDeviceConfigCommand order="1">
  <indivisualSettingFile>dataset.xml</indivisualSettingFile>
</importDeviceConfigCommand>
```
— 810, 811, 812, 813

`<instructionId>001</instructionId>` — 801

```
<id>001</id>
<Time>2021/05/01 00:00</Time>
<!--SETTING DATA IMPORT PROCESSING-->
<importDeviceConfigCommand order="1">
  <indivisualSettingFile>dataset.xml</indivisualSettingFile>
</importDeviceConfigCommand>
```
— 810, 811, 812, 813

```
<id>002</id>
<Time>Immediate</Time>
<BundleDownload order="1">
  <Parameter downloadid="1" appid="1234567" ver="2.0"
             license="xyzabcdef..."
  /Parameter>
</BundleDownload>
<BundleInstall order="2">
  <Parameter downloadid="1" license="xyzabcdef..."
             days="30" /Parameter>
</BundleInstall>
<BundleStart order="3">
  <Parameter appid="1234567" /Parameter>
</BundleStart>
<!--OPERATION COMMAND EXECUTION PROCESSING-->
<OperationCommand order="1">
  <value>operation.xml</value>
</OperationCommand>
```
— 820, 821, 822, 823, 824, 825, 826

830

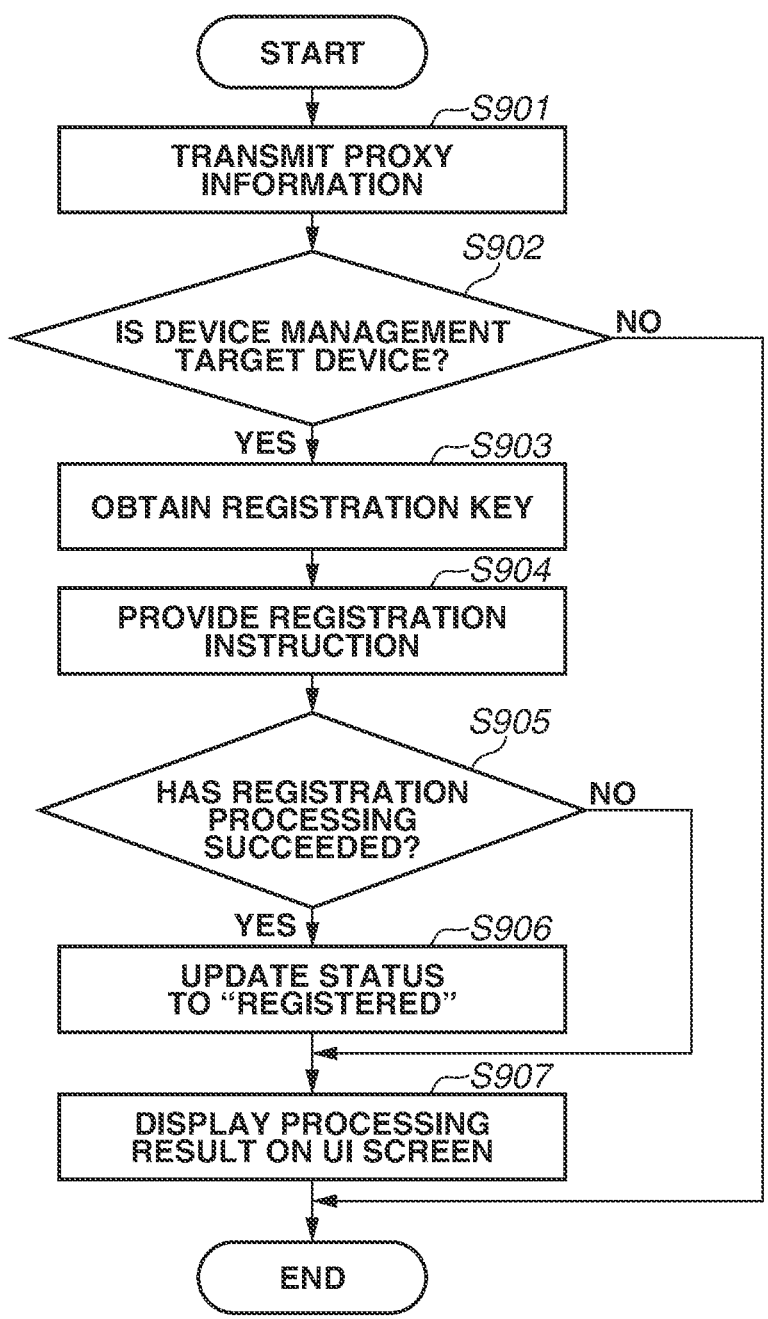

FIG. 10

| MANAGED DEVICE LIST | | | | | |
|---|---|---|---|---|---|
| DEVICE ID (1001) | DEVICE NAME (1002) | IP ADDRESS (1003) | MAC ADDRESS (1004) | REGISTRATION STATUS (1005) | COMMUNICATION TEST (1006) |
| AAA0001 | DEVICE A | 11.11.11.11 | 11:11:11:11:11:11 | REGISTERED | SERVICE A: CONFIRMED<br>SERVICE B: UNCONFIRMED |
| CCC0001 | DEVICE C | 33.33.33.33 | 33:33:33:33:33:33 | UNREGISTERED | SERVICE A: CONFIRMED<br>SERVICE C: CONFIRMED |
| ... | ... | ... | ... | ... | ... |

1000

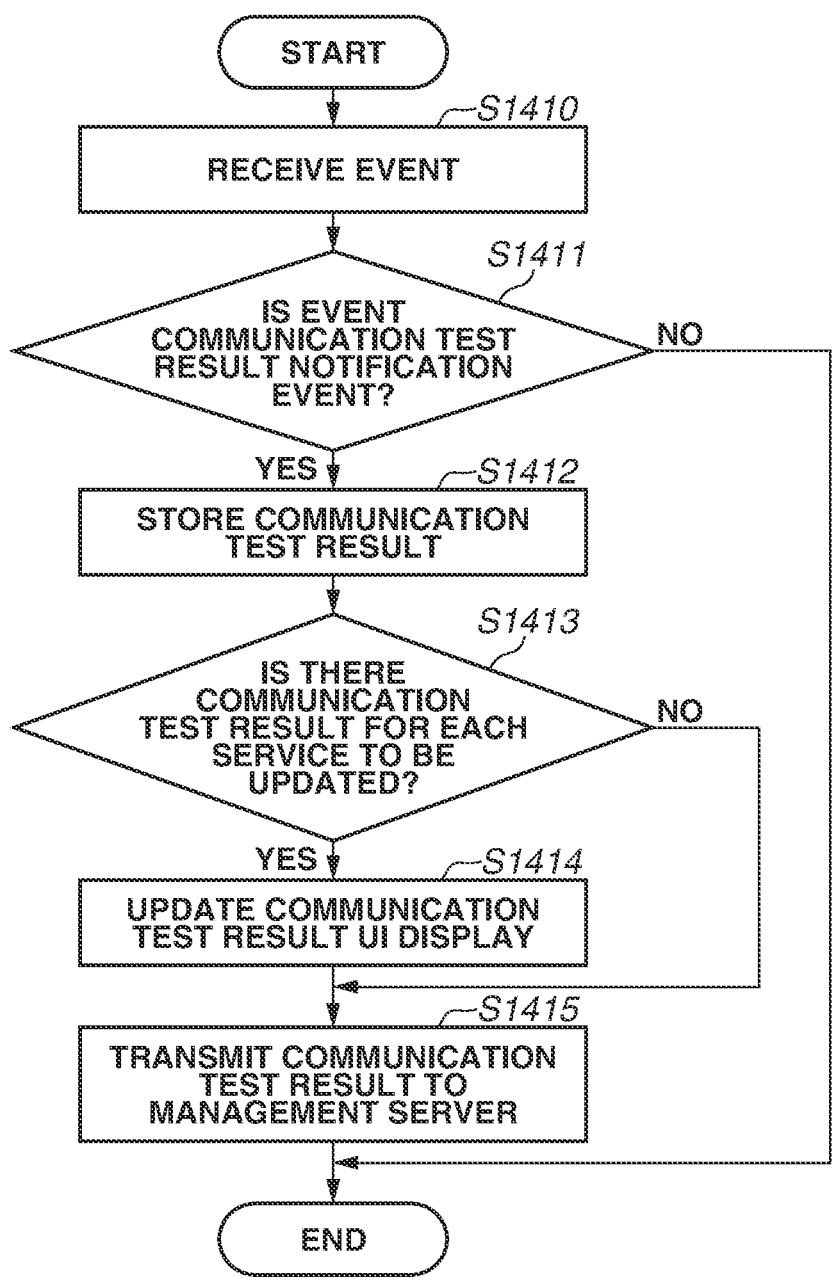

NETWORK DEVICE AND PROCESSING METHOD FOR NETWORK DEVICE FOR AGGREGATING COMMUNICATIONS

BACKGROUND

Field of the Disclosure

The present disclosure relates to a network device and a processing method for the network device.

Description of the Related Art

There is known a device management system that manages and analyzes data collected from devices typified by multifunction apparatuses. The device management system includes a monitoring apparatus that collects information about the devices and a management server that manages the information collected by the monitoring apparatus. The monitoring apparatus obtains data using periodic polling to manage the devices.

Japanese Patent Application Laid-open No. 2018-136876 discusses a method in which a proxy function is mounted on a monitoring apparatus and, if a network device includes a monitoring module, the monitoring module is enabled so that monitoring information is transmitted to a management server using the proxy function of the monitoring apparatus.

When a plurality of devices are introduced, it is not permissible that the plurality of devices are connected individually to the Internet from the view point of security operation and management. For this reason, there are client requests to aggregate Internet connections. In such a client environment, there is a monitoring apparatus operating as a proxy server for aggregating communications from the devices. Such a monitoring apparatus can notify the devices of setting information about the proxy server held by the monitoring apparatus to instruct the devices to execute required processes.

When introduction of a cloud service is considered, there is a case where a monitoring apparatus operating as a proxy server for aggregating communications from a plurality of devices is introduced in a client environment where it is not permissible to connect the plurality of devices individually to the Internet. In such a case, proxy information set in each device needs to be switched to proxy information of the proxy server operated in the monitoring apparatus. From the view point of the security operation and management, the proxy information of the devices needs to be switched all together at a timing. However, in the client environment where the plurality of devices is introduced, since communication paths of the devices are sequentially switched immediately after each device obtains the proxy information from the monitoring apparatus, timings of switching may not be made the same. For this reason, some devices may possibly be connected to the Internet using the proxy information of the conventional communication method, and thus the security of the communications may be vulnerable. In addition, there has been no system for notifying the management server of an aggregation state of the communications of various kinds of service agent.

SUMMARY

According to an aspect of the present disclosure, a network device includes one or more memories and one or more processors. The one or more processors and the one or more memories are configured to obtain proxy information set to the network device, and communicate with a management server via a proxy server using the proxy information in a case where an aggregation mode is enabled and the proxy information is information received from the proxy server or in a case where the aggregation mode is not enabled, and not to communicate with the management server in a case where the aggregation mode is enabled and the proxy information is not the information received from the proxy server.

Further features of the present disclosure will become apparent from the following description of exemplary embodiments with reference to the attached drawings.

BRIEF DESCRIPTION OF THE DRAWINGS

FIGS. 8A and 8B are diagrams each illustrating an example of an instruction sheet.

FIG. 9 is a flowchart illustrating device registration processing performed by the monitoring apparatus.

FIG. 10 is a diagram illustrating an example of an image forming apparatus management screen of the monitoring apparatus.

FIG. 14 is a flowchart illustrating device registration processing performed by the monitoring apparatus.

DESCRIPTION OF THE EMBODIMENTS

Next, with reference to the attached drawings, exemplary embodiments will be described.

<System Configuration>

Figure 1:
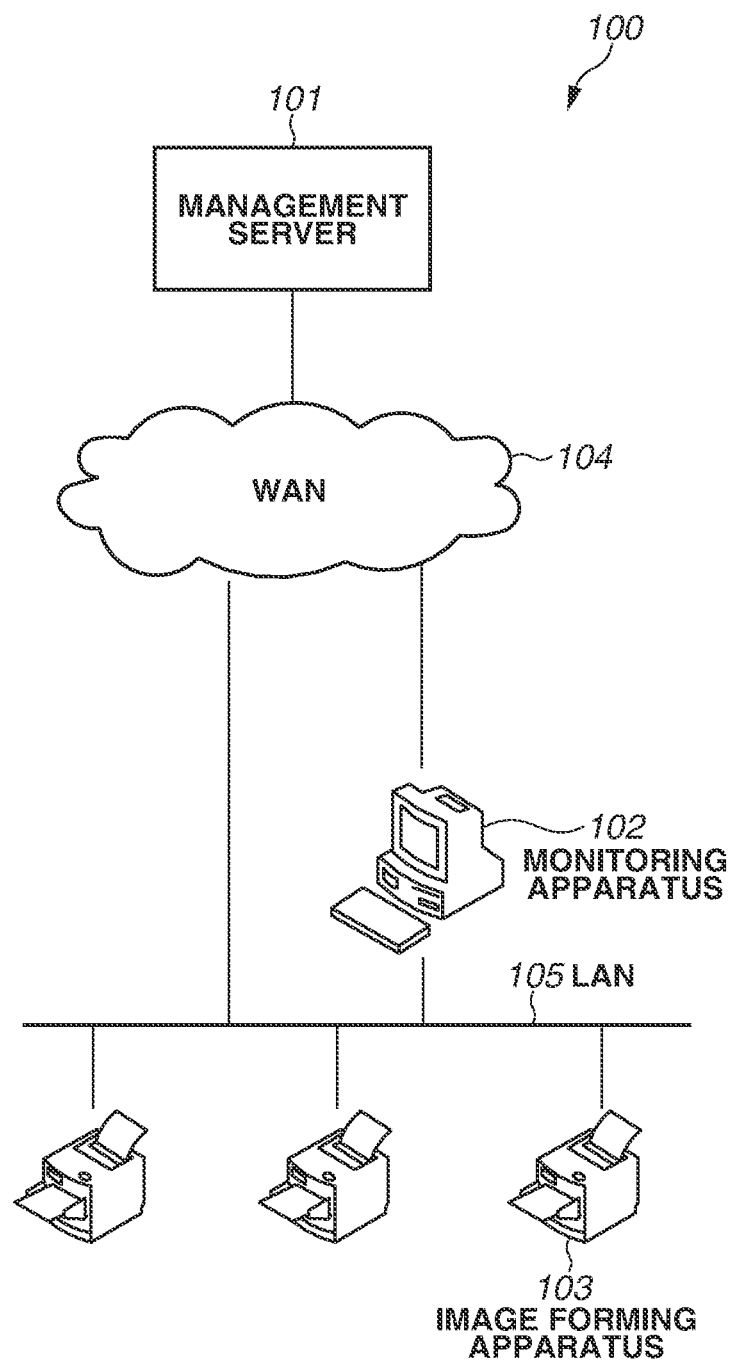
FIG. 1 is a diagram illustrating a configuration example of a network system.

FIG. 1 is a diagram illustrating a configuration example of a network system 100 according to a first exemplary embodiment. The network system 100 includes a management server 101, a monitoring apparatus 102, and a plurality of image forming apparatuses 103. Each of the image forming apparatuses 103 is an example of a network device. The monitoring apparatus 102 collects data from the image forming apparatuses 103. The management server 101 manages the data collected by the monitoring apparatus 102.

The management server 101 is connected to the monitoring apparatus 102 via a wide area network (WAN) 104 to manage the monitoring apparatus 102 and data in the image forming apparatuses 103 in an integrated manner. The monitoring apparatus 102 monitors the image forming apparatuses 103 via a local area network (LAN) 105 to obtain various kinds of data from the image forming apparatuses 103. Each of the image forming apparatuses 103 is a laser beam printer (LBP) or a multifunction peripheral (MFP), and is monitored by the monitoring apparatus 102. In the present exemplary embodiment, the management server 101 is connected to the monitoring apparatus 102 via the WAN 104. Alternatively, the management server 101 may be connected to the monitoring apparatus 102 via the LAN 105. The image forming apparatuses 103 are connected to the monitoring apparatus 102 via the LAN 105. Alternatively, the image forming apparatuses 103 may be connected to the management server 101 via the LAN 105 or the WAN 104.

<Internal Configuration of Image Forming Apparatus 103>

Figure 2:
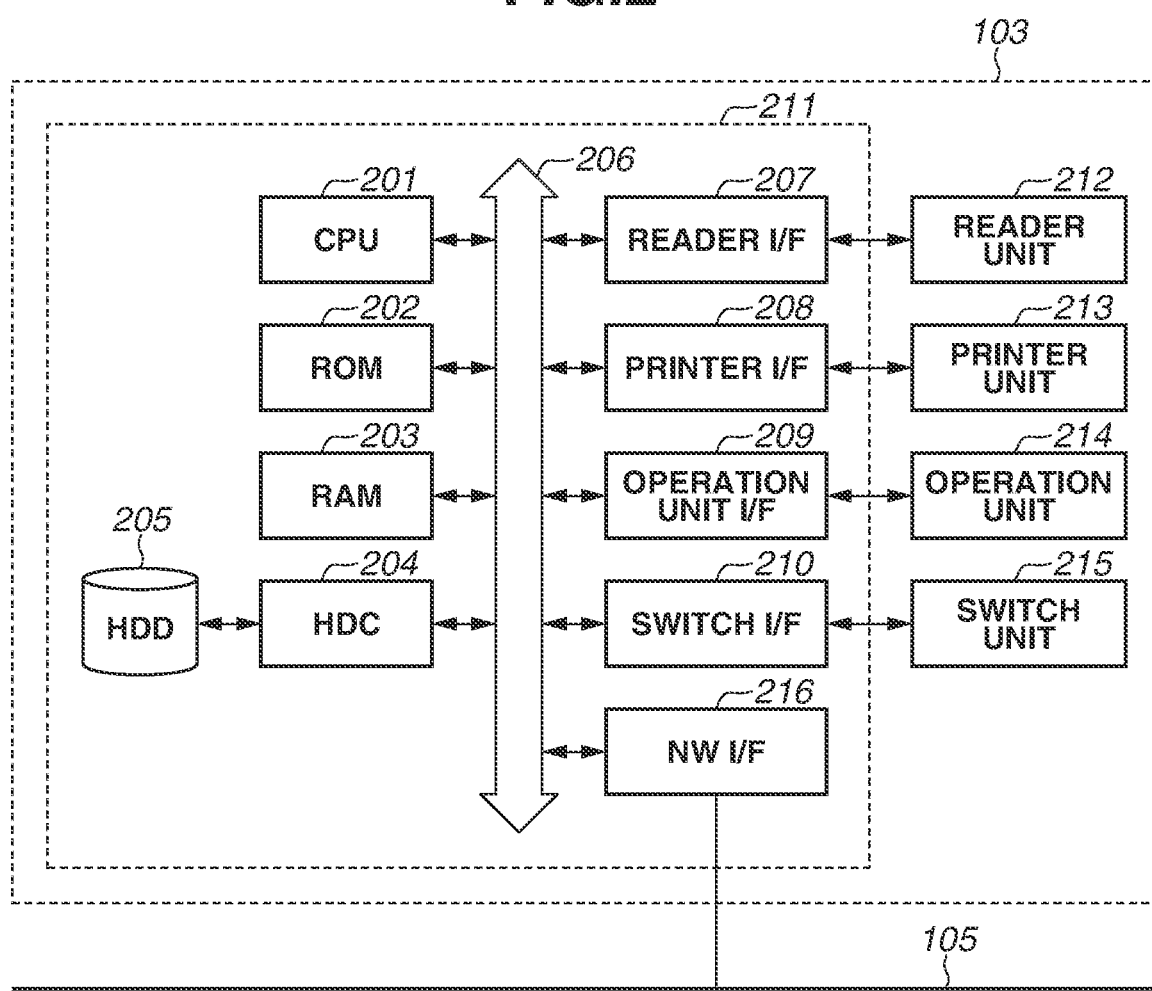
FIG. 2 is a block diagram illustrating a configuration example of an image forming apparatus.

FIG. 2 is a block diagram illustrating a configuration example of each of the image forming apparatuses 103. The image forming apparatus 103 includes an overall control unit 211, a reader unit 212, a printer unit 213, an operation unit 214, and a switch unit 215. The overall control unit 211 includes a central processing unit (CPU) 201, a read-only memory (ROM) 202, a random access memory (RAM) 203, a hard disk controller (HDC) 204, a hard disk drive (HDD) 205, a system bus 206, and a reader interface (I/F) 207. The overall control unit 211 further includes a printer I/F 208, an operation unit I/F 209, a switch I/F 210, and a network (NW) I/F 216.

The CPU 201 executes a program, stored in the ROM 202 or the HDD 205, for performing overall control of the image forming apparatus 103 to integrally control the image forming apparatus 103. The RAM 203 functions as a work area of the CPU 201. The HDC 204 is a hard disk controller for controlling the HDD 205.

The reader I/F 207 is connected to the reader unit 212 to control the reader unit 212. The printer I/F 208 is connected to the printer unit 213 to control the printer unit 213. The operation unit I/F 209 is connected to the operation unit 214 to control display on the operation unit 214 and user's inputs from the operation unit 214. The operation unit 214 includes buttons for operation, a display unit, and the like. The switch I/F 210 is connected to the switch unit 215 to control operation from the switch unit 215. The switch unit 215 includes switches and the like for operation.

The NW I/F 216 exchanges data with external apparatuses, such as the management server 101 and the monitoring apparatus 102, via the LAN 105.

The overall control unit 211 controls the overall operation of the image forming apparatus 103 in addition to the reader unit 212, the printer unit 213, the operation unit 214, and the switch unit 215. The reader unit 212 reads an image on a document, and outputs image data corresponding to the read document image to the printer unit 213 or stores the read document image in the HDD 205, based on a user's instruction. Further, the reader unit 212 can transmit the image data to the management server 101 or the monitoring apparatus 102 connected to the LAN 105, via the NW I/F 216.

The printer unit 213 prints the document read by the reader unit 212 or the image data stored in the HDD 205. Further, the printer unit 213 receives a print job from the management server 101, the monitoring apparatus 102, or the like connected to the LAN 105, via the NW I/F 216, and prints the print job.

The NW I/F 216 is connected to other information processing apparatuses on the LAN 105 via the LAN 105 to enable the overall control unit 211 to communicate therewith. The operation unit 214 displays information from the overall control unit 211 to a user or notifies the overall control unit 211 of the user's input via buttons and a display apparatus, a liquid crystal display screen with a touch panel input unit, or a combination thereof. The switch unit 215 controls a power on/off state of the overall control unit 211.

<Internal Configurations of Monitoring Apparatus 102 and Management Server 101>

Figure 3:
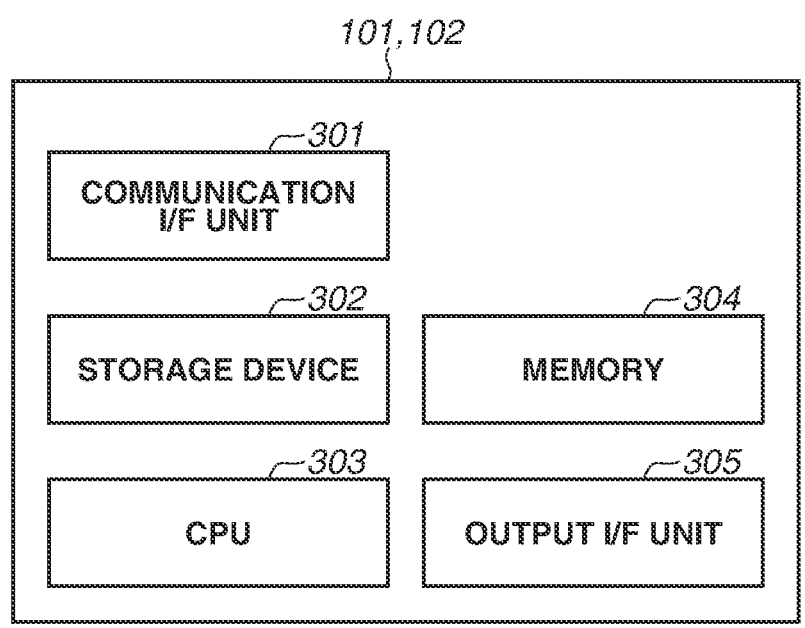
FIG. 3 is a block diagram illustrating a configuration example of a monitoring apparatus and a management server.

FIG. 3 is a block diagram illustrating a configuration example of each of the monitoring apparatus 102 and the management server 101. The monitoring apparatus 102 and the management server 101 each have a communication I/F unit 301, a storage device 302, a central processing unit (CPU) 303, a memory 304, and an output I/F unit 305.

The communication I/F unit 301 is a communication interface unit for communicating with an external system or apparatus. The storage device 302 stores an operating system (OS), programs, management data, and data or the like collected from the external system or the apparatus. The CPU 303 loads a program into the memory 304 from the storage device 302, and executes the loaded program. The output I/F unit 305 is an output interface unit for outputting an execution result of a program or the like to an output device such as a display.

<Functional Configuration of Image Forming Apparatus 103>

Figure 4:
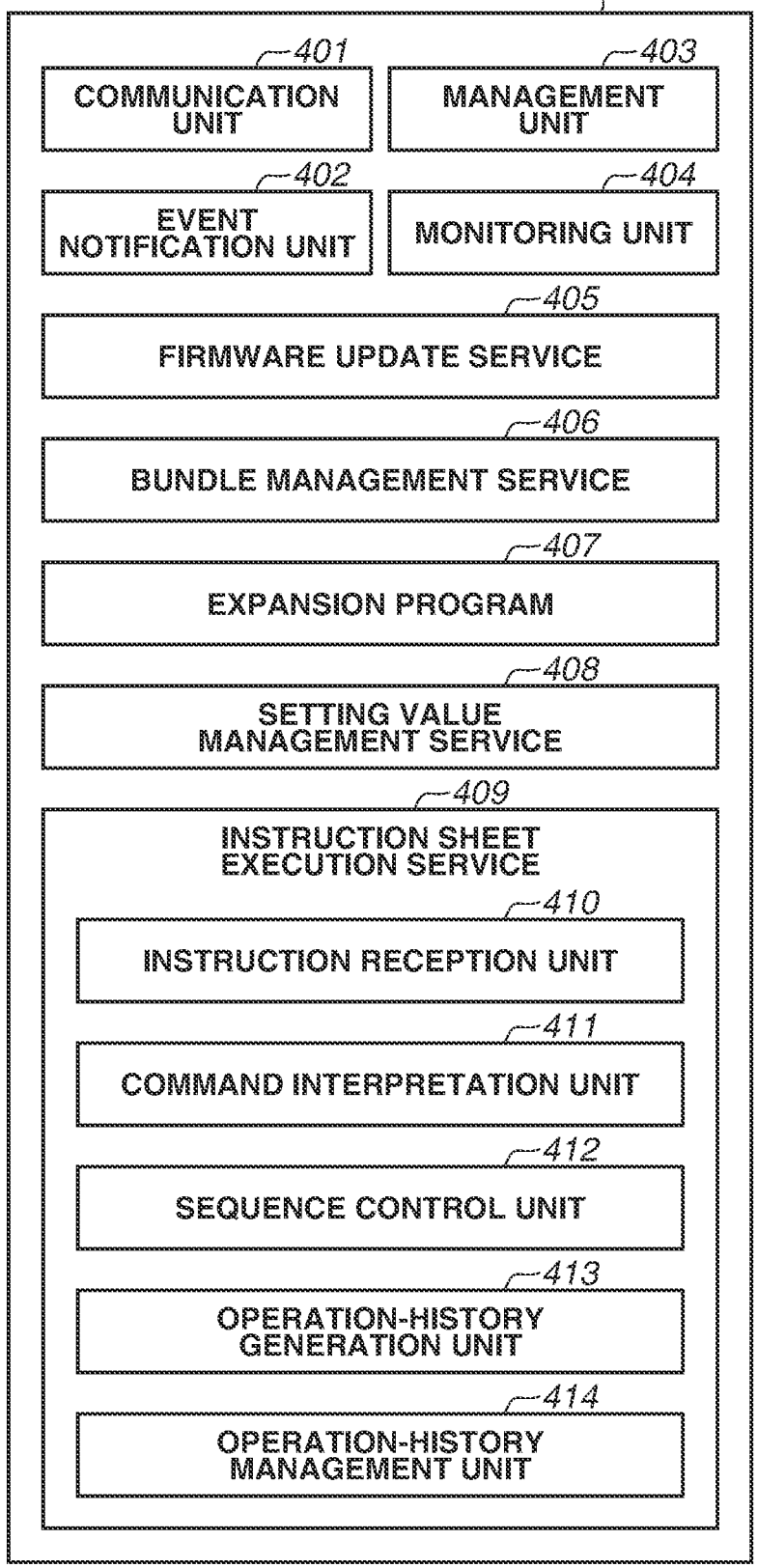
FIG. 4 is a block diagram illustrating a functional configuration example of the image forming apparatus.

FIG. 4 is a block diagram illustrating a functional configuration example of the image forming apparatus 103. The image forming apparatus 103 can implement each functional unit in FIG. 4 by the CPU 201 executing programs. The image forming apparatus 103 includes a communication unit 401, an event notification unit 402, and a management unit 403. Further, the image forming apparatus 103 includes a monitoring unit 404, a firmware update service 405, a bundle management service 406, an expansion program 407, a setting value management service 408, and an instruction sheet execution service 409. The instruction sheet execution service 409 includes an instruction reception unit 410, a command interpretation unit 411, a sequence control unit 412, an operation-history generation unit 413, and an operation-history management unit 414.

The communication unit 401 communicates with the management server 101 and the monitoring apparatus 102. In a case where a communication test with the monitoring apparatus 102 is performed, the event notification unit 402 notifies the monitoring apparatus 102 of an event of a result. The management unit 403 performs data management and required processing based on an instruction from the monitoring apparatus 102 that has received the event. The monitoring unit 404 performs monitoring processing in a case where registration processing has succeeded.

The firmware update service 405 is a service that provides various functions for updating firmware. For example, the firmware update service 405 compares firmware designated by a user and firmware in the image forming apparatus 103 to determine whether to update the firmware in the image forming apparatus 103 to the firmware designated by the user. Further, the firmware update service 405 is a system bundle that installs downloaded firmware and updates the firmware in the image forming apparatus 103.

The bundle management service 406 is a system bundle that manages life cycles of bundles, such as additional/updating installations, uninstallations, starts, and stops of the plurality of bundles. The bundle management service 406 is a utility library commonly useful for the expansion program 407, and is provided from the system.

The expansion program 407, on which the bundle management service 406 performs the additional/updating installations, uninstallations, starts, and stops, can access other expansion programs, or each module of the image forming apparatus 103. Further, the expansion program 407 including a user interface (UI) can also display icons or the like on a main menu screen (not illustrated) displayed on the operation unit 214 of the image forming apparatus 103.

The setting value management service 408 is a program for managing various kinds of setting information about a printer or a facsimile machine. The setting value management service 408 provides a function of rewriting the setting information of the image forming apparatus 103, for example, when a user designates one piece or a plurality of pieces of setting information, or a file including a plurality of pieces of setting information.

The instruction sheet execution service 409 is a system bundle that analyzes an instruction sheet of a configuration change instruction received from the management server 101, and performs processing of the configuration change instruction in the designated order. The instruction sheet execution service 409 requests the bundle management service 406 to install a downloaded bundle in a case where a last-in bundle installation instruction is given. Further, the instruction sheet execution service 409 requests the firmware update service 405 to update the downloaded firmware in a case where a firmware update instruction is given.

Next, a module configuration of the instruction sheet execution service 409 will be described. The instruction reception unit 410 is a module for receiving an instruction sheet including a plurality of commands from the management server (cloud) 101. The command interpretation unit 411 is a module for interpreting the commands described in the received instruction sheet. The sequence control unit 412 is a module for executing command objects generated by the command interpretation unit 411 sequentially. The operation-history generation unit 413 generates, after executing all the commands described in the instruction sheet, an operation history using all command execution results stored in the operation-history management unit 414. The operation-history management unit 414 is a module for storing and managing an execution result for each command execution. The operation-history management unit 414 has a function of, if inquired thereto with an instruction sheet number and a command number, obtaining a corresponding execution result.

<Functional Configuration of Monitoring Apparatus 102>

Figure 5:
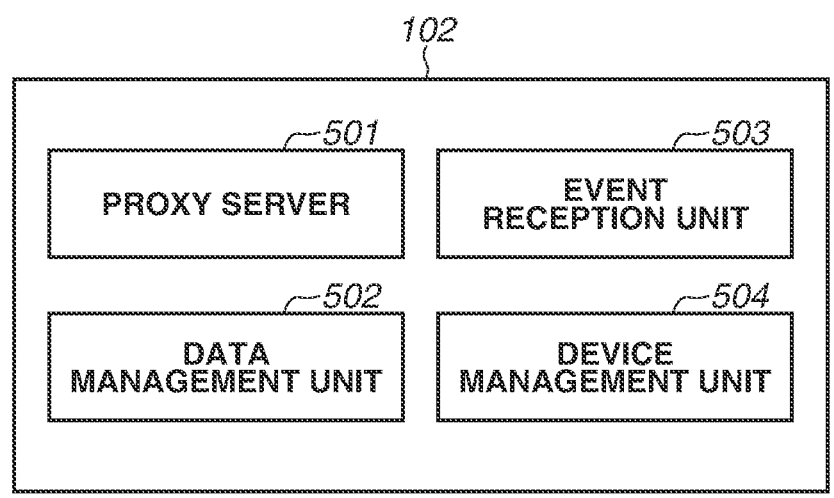
FIG. 5 is a block diagram illustrating a functional configuration example of the monitoring apparatus.

FIG. 5 is a block diagram illustrating a functional configuration example of the monitoring apparatus 102. The monitoring apparatus 102 includes a proxy server 501, a data management unit 502, an event reception unit 503, and a device management unit 504.

The proxy server 501 aggregates communications from the image forming apparatuses 103. The data management unit 502 manages information about the image forming apparatus 103 required for monitoring, such as status information indicating whether the image forming apparatus 103 is a management target of the data management unit 502. The event reception unit 503 receives the event notified by the image forming apparatus 103. The device management unit 504 sets proxy server information held by the device management unit 504 to the image forming apparatus 103, and provides a registration instruction to the image forming apparatus 103.

<Registration Processing Flow of Image Forming Apparatus 103>

Figure 6:
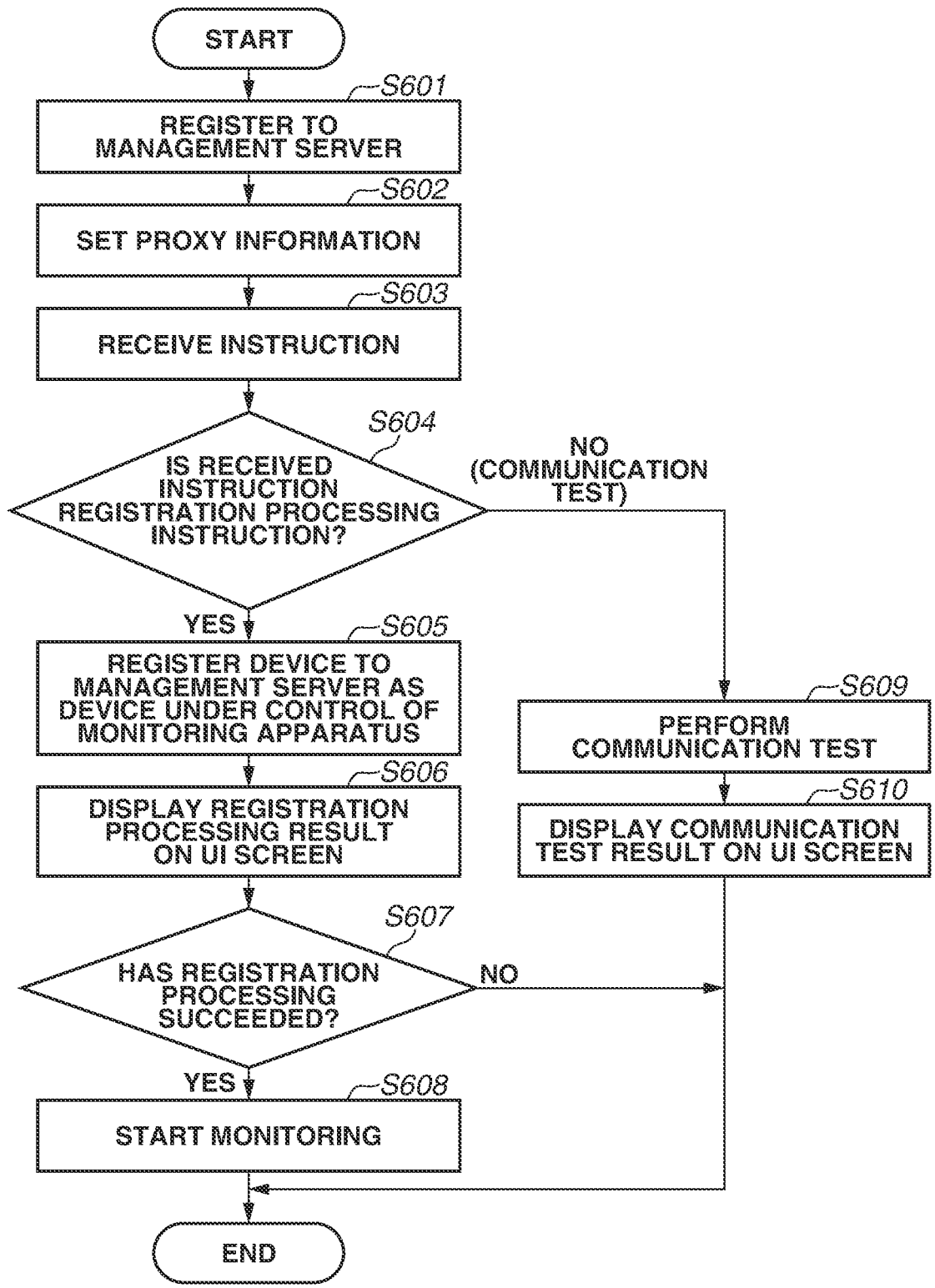
FIG. 6 is a flowchart illustrating device registration processing performed by the image forming apparatus.

FIG. 6 is a flowchart illustrating device registration processing performed by the image forming apparatus 103. Hereinbelow, a processing method performed by the image forming apparatus 103 will be described.

In step S601, the communication unit 401 performs registration processing with the management server (cloud) 101. As an example of a trigger to execute the processing, an installation personnel of image forming apparatuses, including the image forming apparatus 103, in FIG. 1 inputs a registration instruction via a UI screen of the image forming apparatus 103 (a first image forming apparatus) together with input of a registration key of the first image forming apparatus. The registration key of the first image forming apparatus is a registration key for enabling temporary registration thereof with the management server 101, not a registration key for associating the monitoring apparatus 102 and the first image forming apparatus with each other. For example, the registration key of the first image forming apparatus may be associated with a client, or with an organization higher than the client (e.g., sales company managing the client). The management server 101 performs authentication of the first image forming apparatus based on the registration key, and in a case where the authentication has succeeded, returns credential information to issue a token required for the communication thereafter. The management unit 403 determines whether the registration processing has succeeded. In a case where the registration processing has succeeded, the management unit 403 displays a UI screen 701 in FIG. 7A indicating that the registration processing has succeeded. In a case where the registration processing has failed, the management unit 403 displays an error screen indicating that the registration processing has failed, such as a UI screen 703 in FIG. 7C.

In step S602, the management unit 403 functions as a setting unit to receive a request including proxy information from the monitoring apparatus 102, and sets the received proxy information to the image forming apparatus 103. In step S603, after the above-described setting, the communication unit 401 receives an instruction from the monitoring apparatus 102.

In step S604, the management unit 403 determines whether the instruction received from the monitoring apparatus 102 is a registration processing instruction. In a case where the management unit 403 receives the registration processing instruction (YES in step S604), the processing proceeds to step S605. In a case where the management unit 403 receives a communication test instruction not the registration processing instruction (NO in step S604), the processing proceeds to step S609.

In step S605, the communication unit 401 functions as a registration processing unit to perform registration processing with the management server 101 using a registration key of a second image forming apparatus received from the monitoring apparatus 102 via the proxy server 501 of the monitoring apparatus 102. The registration key of the second image forming apparatus will be described below with reference to FIG. 10.

In step S606, the management unit 403 displays a result of the registration processing on the UI screen. In step S607, the management unit 403 determines whether the registration processing has succeeded. In a case where the registration processing has succeeded (YES in step S607), the processing proceeds to step S608. In a case where the registration processing has failed (NO in step S607), the processing in FIG. 6 ends.

In step S608, the monitoring unit 404 starts the monitoring processing. Then, the communication unit 401 transmits the information monitored by the monitoring unit 404 to the management server 101. In the present exemplary embodiment, the communication unit 401 is capable of obtaining token information by performing a token issue request to the management server 101 using the credential information returned in step S601. In this case, the communication unit 401 assigns the token information to the monitored information and transmits the monitored information to the management server 101. Then, the processing in FIG. 6 ends.

In step S609, the communication unit 401 performs a communication test on the management server 101 via the proxy server 501 of the monitoring apparatus 102 using the registration key of the first image forming apparatus 103 input via the UI screen. The event notification unit 402 transmits a result notification event of the communication test to the monitoring apparatus 102.

In step S610, the management unit 403 displays the result of the communication test. Then, the processing in FIG. 6 ends.

<Example of Processing Result Display by Image Forming Apparatus 103>

Figure 7A:
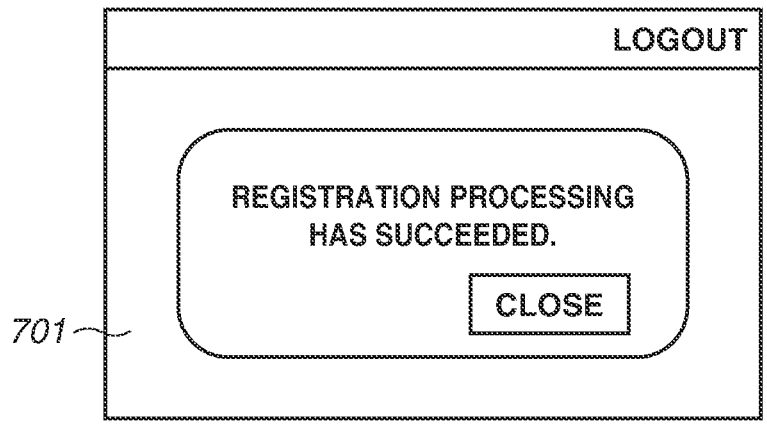
FIGS. 7A, 7B, and 7C are diagrams each illustrating an example of a processing result display of the image forming apparatus.
Figure 7B:
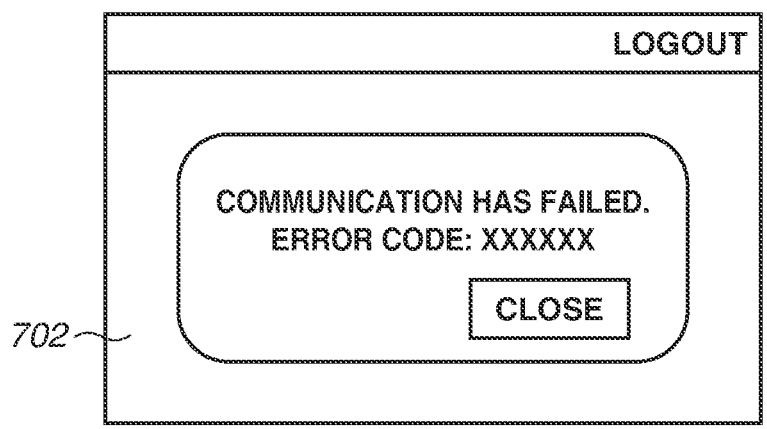
Figure 7C:
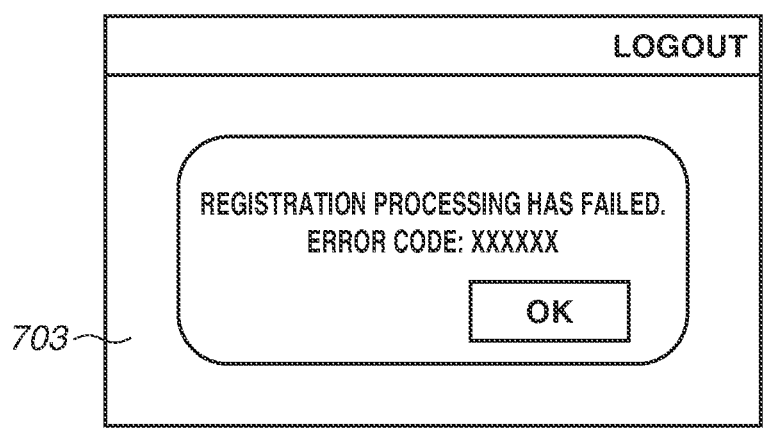

Each of FIGS. 7A to 7C illustrates an example of a processing result display screen of the image forming apparatus 103 according to the present exemplary embodiment. The UI screen 701 in FIG. 7A is an example of a UI screen displayed in the case where the registration processing with the management server 101 in step S601 has succeeded. A UI screen 702 in FIG. 7B is an example of a UI screen displayed in step S610 in the case where the communication test to the monitoring apparatus 102 has failed. The UI screen 703 in FIG. 7C is an example of a UI screen displayed in the case where the registration processing with the management server 101 has failed.

<Example of Instruction Sheet>

Each of FIGS. 8A and 8B is a diagram illustrating an example of the instruction sheet. First, an instruction sheet 800 in FIG. 8A will be described. The instruction sheet 800 is an example in which one command sequence is defined, and includes an InstructionId 801 and a command sequence 810. The InstructionId 801 indicates a number of the instruction sheet 800, and a unique number is assigned to each instruction sheet.

Next, the command sequence 810 will be described. The command sequence 810 includes an identifier (ID) 811, a time 812, and a command 813. The ID 811 indicates a number of the command sequence 810, and a unique number is assigned to each command sequence. The time 812 is an execution time of the command sequence 810 indicating a time at which the command sequence 810 is executed. The command 813 is an importDeviceConfigCommand command indicating a setting data import instruction. Further, an order designation indicates a command number, and a number is assigned in order from 1. In FIG. 8A, setting value data "dataset.xml" is designated with an indivisualSettingFile tag.

Next, an instruction sheet 830 in FIG. 8B will be described. The instruction sheet 830 includes the InstructionId 801, the command sequence 810, and a command sequence 820. The InstructionId 801, the command sequence 810, the ID 811, the time 812, and the command 813 are the same as those described with reference to the instruction sheet 800, and descriptions thereof are omitted.

The command sequence 820 will be described. The command sequence 820 includes an ID 821, a time 822, and commands 823 to 826. The ID 821 is a number of the command sequence 820, and "002" is designated thereto. The time 822 is an execution time of the command sequence 820 indicating a time at which the command sequence 820 is executed. In the example, as the time 822, "Immediate" indicating to execute the command sequence 820 immediately is designated.

The command 823 is a BundleDownload command indicating a bundle download instruction.

In FIG. 8B, the download number is set to "1", the bundle ID is set to "1234567", and the bundle version is set to "2.0".

The command 824 is a BundleInstall command indicating a bundle new installation instruction. In FIG. 8B, the download number "1" is designated to apply the bundle downloaded with the BundleDownload of the command number "1". Further, the command 824 includes license information required for the bundle installation.

The command 825 is a BundleStart command indicating a bundle start instruction. In FIG. 8B, the bundle ID "1234567" is designated to start the bundle installed with the command number "2".

The command 826 is an OperationCommand command indicating a device-manipulation operation execution instruction. Further, an order designation indicates a command number, and a number is assigned in order from 1. In the command 826, "operation.xml" in which a list of operation commands is described is designated with value tags.

In addition, the instruction sheet 800 or the instruction sheet 830 may be manually generated, or may be automatically generated by a method by which an application on the management server 101 displays an instruction sheet generation UI (not illustrated) to an instructor, and the system automatically generates the instruction sheet 800 or the instruction sheet 830. In the present exemplary embodiment, the system automatically generates the instruction sheet 800 or the instruction sheet 830 according to a contract made with a user. In FIGS. 8A and 8B, the instruction sheet 800 and the instruction sheet 830 are described in an extended markup language (XML) format, but the format thereof is not limited thereto.

<Operation Processing of Monitoring Apparatus 102>

FIG. 9 is a flowchart illustrating an example of operation processing performed by the monitoring apparatus 102 according to the first exemplary embodiment.

In step S901, the device management unit 504 transmits proxy information of the proxy server 501 to the image forming apparatus 103.

In step S902, the data management unit 502 determines whether the image forming apparatus 103 is a management target of the data management unit 502 based on image forming apparatus management information held by the data management unit 502. In a case where the image forming apparatus 103 is the management target (YES in step S902), the processing proceeds to step S903. On the other hand, in a case where the image forming apparatus 103 is not the management target (NO in step S902), the processing in FIG. 9 ends.

In step S903, the device management unit 504 obtains a registration key of the second image forming apparatus from the management server 101. The registration key of the second image forming apparatus is a registration key of the image forming apparatus 103 to associate the monitoring apparatus 102 and the image forming apparatus 103 with each other.

In step S904, the device management unit 504 assigns the registration key of the second image forming apparatus to the image forming apparatus 103, and provides a registration instruction.

In step S905, the device management unit 504 determines whether the registration processing under the registration instruction has succeeded. In a case where the registration processing has succeeded (YES in step S905), the processing proceeds to step S906. In a case where the registration processing has failed (NO in step S905), the processing proceeds to step S907.

In step S906, the data management unit 502 updates a registration status 1005 in FIG. 10 to "registered".

In step S907, the data management unit 502 displays the processing result on the UI screen. Then, the processing in FIG. 9 ends.

FIG. 14 is a flowchart illustrating an example of operation processing performed by the monitoring apparatus 102, and more specifically illustrating a processing procedure in a case where the event reception unit 503 receives an event of the communication test from the image forming apparatus 103.

In step S1410, the event reception unit 503 receives an event from the image forming apparatus 103.

In step S1411, the event reception unit 503 determines whether the event received from the image forming apparatus 103 is a notification event of a result of the communication test. In a case where the event is the notification event of the communication test result (YES in step S1411), the processing proceeds to step S1412. On the other hand, in a case where the event is not the notification event of the communication test result (NO in step S1411), the processing in FIG. 14 ends.

In step S1412, the device management unit 504 stores the communication test result. In step S1413, the device management unit 504 manages the communication test result for each of various services operating on the management target image forming apparatus 103, and determines whether there is a communication test result to be updated. In a case where there is the communication test result to be updated (YES in step S1413), the processing proceeds to step S1414. On the other hand, in a case where there is not the communication test result to be updated (NO in step S1413), the processing proceeds to step S1415.

In step S1414, the data management unit 502 updates a UI display of a communication test status 1006 on a management screen 1000 of the monitoring apparatus 102 in FIG. 10 described below, based on an update result of the communication test result.

In step S1415, the device management unit 504 immediately transmits the communication test result to the management server 101. Then, the processing in FIG. 14 ends.

<Example of Image Forming Apparatus Management Screen of Monitoring Apparatus 102>

FIG. 10 illustrates an example of an image forming apparatus management screen of the monitoring apparatus 102. First, the image forming apparatus management information will be described. The image forming apparatus management information includes various kinds of information about the image forming apparatus 103 managed for monitoring. The image forming apparatus management information is periodically obtained from the management server 101.

The management screen 1000 is an example of a list window of the management target image forming apparatuses 103. A device ID 1001 is an ID of each of the image forming apparatuses 103, and is information for identifying the image forming apparatus 103. A device name 1002 is a name of each of the image forming apparatuses 103. An Internet Protocol (IP) address 1003 is information about an IP address set to each of the image forming apparatuses 103. A Media Access Control (MAC) address 1004 is information about a MAC address set to each of the image forming apparatuses 103.

The registration status 1005 is information indicating whether the image forming apparatus 103 is registered as a management target of the management server 101. The communication test status 1006 is information indicating a communication state between the monitoring apparatus 102 and various kinds of service operating on the management target image forming apparatus 103.

In addition, to display detailed information about each of the processing results (e.g., error detailed information when the processing has failed), a detailed information screen of the corresponding image forming apparatus 103 may be output upon a click on any one of cells containing the attribute information.

<Flowchart of Image Forming Apparatus 103>

Figure 11:
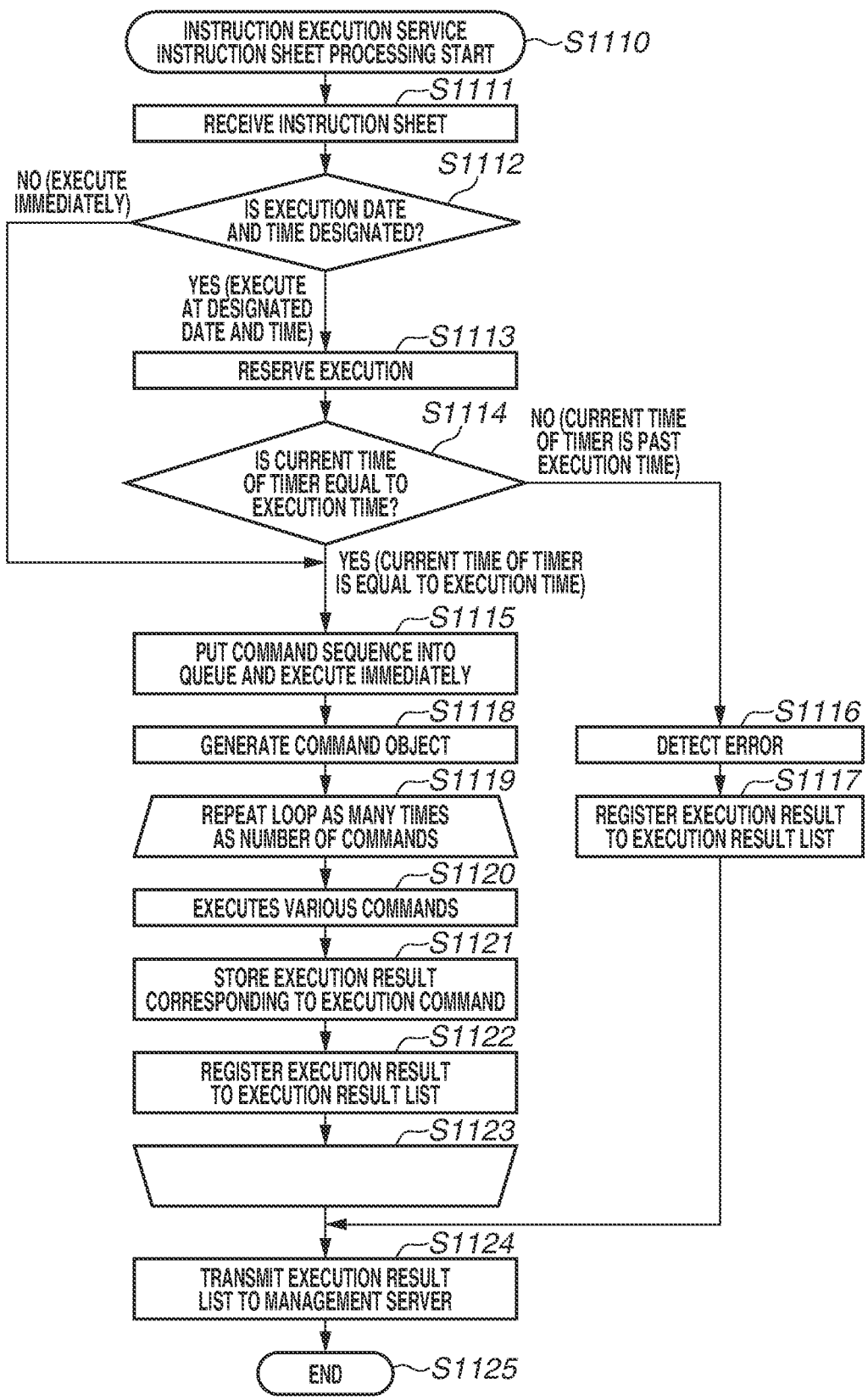
FIG. 11 is a flowchart illustrating an example of operation processing performed by the image forming apparatus.
Figure 12:
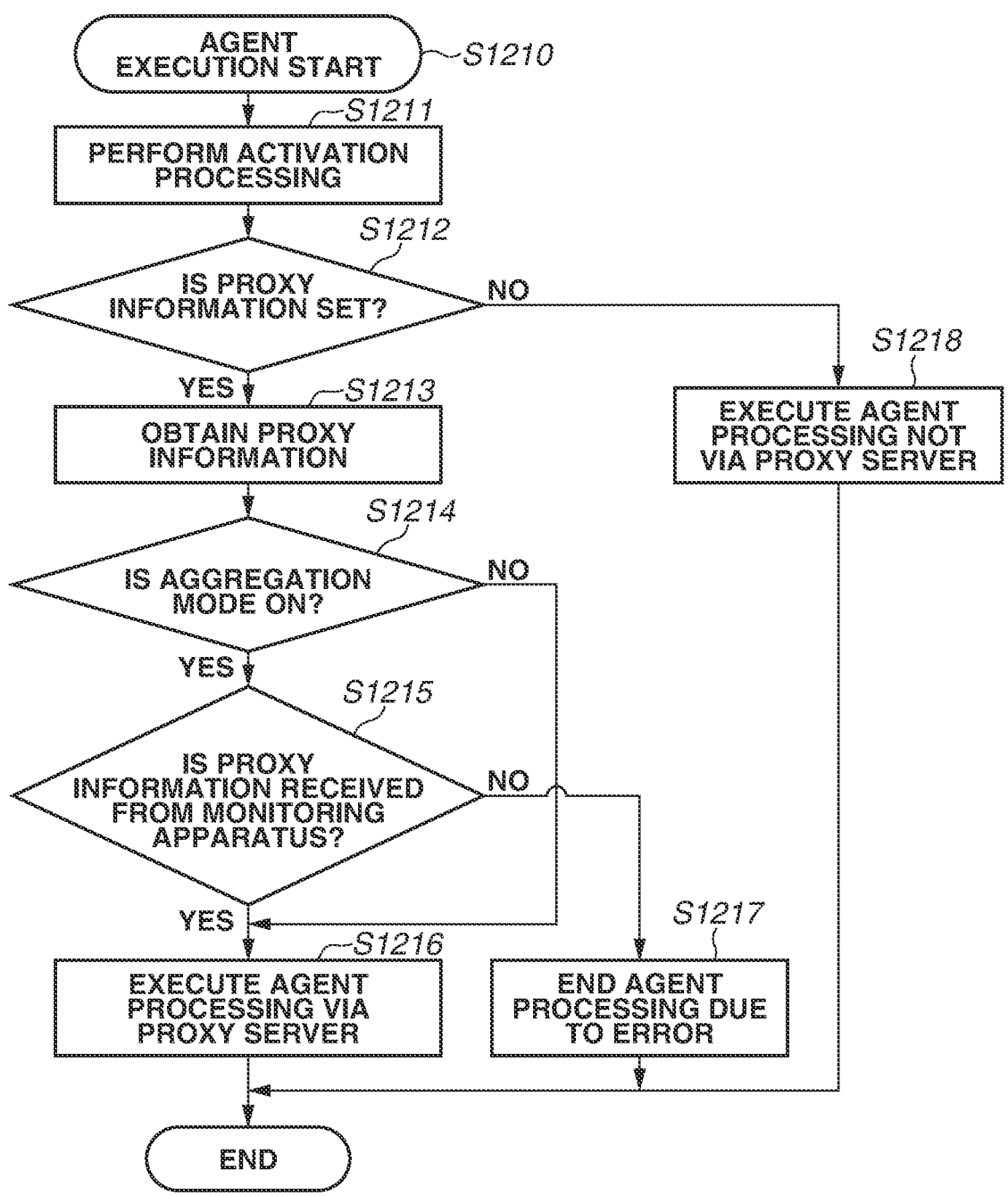
FIG. 12 is a flowchart illustrating an example of operation processing performed by the image forming apparatus.

FIGS. 11 and 12 are flowcharts illustrating an example of operation processing of the image forming apparatus 103 according to the first exemplary embodiment. FIGS. 6 and 9 have been described using a case where the image forming apparatus 103 performs connection from the beginning via the monitoring apparatus (proxy server) 102.

When the plurality of image forming apparatuses 103 is introduced, in a case where connecting the plurality of image forming apparatuses 103 individually to the Internet is not permissible from the view point of the security operation and management, the monitoring apparatus 102 operates as a proxy server to aggregate the communications from the image forming apparatuses 103. The monitoring apparatus 102 can notify the image forming apparatuses 103 of setting information about the proxy server held by the monitoring apparatus 102 to instruct the image forming apparatuses 103 to execute required processing. In this case, proxy information used in the communication method used before needs to be switched to proxy information of the monitoring apparatus 102 for aggregating the communications. From the view point of the security operation and management, the proxy information of the image forming apparatuses 103 needs to be switched all together at a certain timing. However, in the client environment where the plurality of the image forming apparatuses 103 is introduced, since communication paths of the image forming apparatuses 103 are sequentially switched immediately after each image forming apparatuses 103 obtains the proxy information from the monitoring apparatus 102, it is difficult to make switching timings the same. For this reason, some of the image forming apparatuses 103 may possibly be connected to the Internet using the proxy information used in the communication method used before. Thus, in the case of switching the communication paths in the middle, since a simultaneous switching needs to be performed, the management server 101 needs to provide a switching instruction. A processing procedure thereof will be described.

First, a processing procedure in which the instruction sheet execution service 409 receives the instruction sheet 800 illustrated in FIG. 8A and the image forming apparatus 103 is switched to an aggregation mode at the command sequence execution time (time 812) described in the instruction sheet 800 will be described with reference to FIG. 11.

In step S1110, the instruction sheet execution service 409 starts execution processing of the instruction sheet 800. In step S1111, the instruction reception unit 410 receives the instruction sheet 800 from the management server 101.

In step S1112, the instruction reception unit 410 determines whether the designation of the command sequence execution time (time 812) described in the instruction sheet 800 is designation of an execution at a designated date and time or designation of an immediate execution. In a case where the designation of the command sequence execution time is the designation of the execution at the designated date and time (YES in step S1112), the processing proceeds to step S1113. On the other hand, in a case where the designation of the command sequence execution time is the designation of the immediate execution (NO in step S1112), the processing proceeds to step S1115.

In step S1113, the instruction reception unit 410 makes an execution reservation at the command sequence execution time described in the instruction sheet 800, and activates a timer.

In step S1114, the instruction reception unit 410 compares the current time of the timer and the command sequence execution time, and waits until the times become equal to each other. In a case where the times become equal to each other (YES in step S1114), the processing proceeds to step S1115. In a case where the current time of the timer is past the command sequence execution time (NO in step S1114), the processing proceeds to step S1116.

In step S1116, the instruction reception unit 410 performs an error detection. In step S1117, the instruction reception unit 410 registers an execution result corresponding to the execution command to an execution result list, and then the processing proceeds to step S1124.

In step S1115, the instruction reception unit 410 puts a command sequence into a head of a queue to start the processing of the command sequence.

In step S1118, the command interpretation unit 411 generates a command object based on the received instruction sheet 800.

In step S1119, the sequence control unit 412 starts loop processing, which is repeated as many times as the number of command objects generated in step S1118.

In step S1120, the sequence control unit 412 functions as an execution unit that sequentially executes the command objects generated by the command interpretation unit 411. For example, the sequence control unit 412 executes various kinds of command, such as a firmware download command, a firmware update command, a bundle download command, and a bundle install command. In the present exemplary embodiment, the sequence control unit 412 rewrites the setting of the aggregation mode to "enabled" via the setting value management service 408 during the processing.

In step S1121, the sequence control unit 412 stores the execution result corresponding to the execution command.

In step S1122, the sequence control unit 412 registers the command execution result to the execution result list.

In step S1123, in a case where the sequence control unit 412 has not completed the loop processing of all the command objects generated in step S1118, the processing returns to step S1120, and the sequence control unit 412 repeats the execution of the next command. In a case where the sequence control unit 412 has completed the loop processing of all the command objects in step S1123, the processing proceeds to step S1124.

In step S1124, the sequence control unit 412 transmits the execution result list to the management server (cloud) 101. In step S1125, the processing by the instruction sheet execution service 409 ends.

Next, with reference to FIG. 12, a description is given of a procedure in which an agent of each of the various kinds of service operating on the management server 101 determines the switching to the aggregation mode and causes a communication of an agent that does not use the proxy information of the monitoring apparatus 102 to end due to error.

In step S1210, the image forming apparatus 103 starts processing of an agent of a service A operating on the management server 101, which is the expansion program 407. In the present exemplary embodiment, it is described that part of device configuration information (e.g., firmware version information) about the image forming apparatus 103 is transmitted to the management server 101 in activation processing by the agent of the service A, but the processing of the agent is not limited thereto.

In step S1211, the expansion program 407 performs activation processing. In step S1212, the expansion program 407 checks whether proxy information is set to the image forming apparatus 103. In a case where the proxy information is set to the image forming apparatus 103 (YES in step S1212), the processing proceeds to step S1213. On the other hand, in a case where the proxy information is not set to the image forming apparatus 103 (NO in step S1212), the processing proceeds to step S1218.

In step S1218, the expansion program 407 executes the processing of the agent of the service A not via the proxy server 501 of the monitoring apparatus 102. More specifically, the expansion program 407 transmits the device configuration information about the image forming apparatus 103 to the management server 101 not via the proxy server 501 of the monitoring apparatus 102. In this way, before the switching, the image forming apparatus 103 communicates with the management server 101 not via the proxy server 501. Then, the processing in FIG. 12 ends.

In step S1213, the expansion program 407 functions as an obtaining unit that obtains the proxy information set to the image forming apparatus 103.

In step S1214, the expansion program 407 checks whether the aggregation mode held by the image forming apparatus 103 is "enabled" (on). In a case where the aggregation mode is "enabled" (YES in step S1214), the processing proceeds to step S1215. On the other hand, in a case where the aggregation mode is not "enabled" (NO in step S1214), the processing proceeds to step S1216.

In step S1215, the expansion program 407 determines whether the proxy information obtained in step S1213 is information received from the monitoring apparatus 102 (proxy server 501). In a case where the proxy information is the information received from the monitoring apparatus 102 (YES in step S1215), the processing proceeds to step S1216. On the other hand, in a case where the proxy information is not the information received from the monitoring apparatus 102 (NO in step S1215), the expansion program 407 determines that the proxy information is not transmitted from the monitoring apparatus 102 even though the image forming apparatus 103 is in the aggregation mode, and the processing proceeds to step S1217.

In step S1217, the expansion program 407 ends the processing of the expansion program 407 due to error. In this way, the image forming apparatus 103 does not communicate with the management server 101. Through the processing described above, it is possible to prevent the image forming apparatus 103 from connecting to the Internet using the proxy information used in the communication method used before. Then, the processing in FIG. 12 ends.

In step S1216, the expansion program 407 executes the processing of the expansion program 407 using the obtained proxy information, and executes the processing of the agent of the service A via the proxy server 501. In the case where the aggregation mode is "enabled", the expansion program 407 executes the processing of the expansion program 407 using the proxy information received from the monitoring apparatus 102, and transmits the device configuration information about the image forming apparatus 103 to the management server 101 via the proxy server 501 of the monitoring apparatus 102. In the case where the aggregation mode is "disabled" (off), the expansion program 407 transmits the device configuration information about the image forming apparatus 103 to the management server 101 using the proxy information of the communication method used before, via the proxy server 501. In this way, the image forming apparatus 103 functions as a communication unit to communicate with the management server 101 using the proxy information, via the proxy server 501.

In the case where the processing of the expansion program 407 fails, since the monitoring apparatus 102 retries a proxy setting, such as writing the proxy information, to the image forming apparatus 103, the monitoring unit 404 transmits error information to the management server 101. Thus, the image forming apparatus 103 does not need to notify the management server 101 of the processing result of the expansion program 407 using the proxy information that is not obtained from the monitoring apparatus 102, after the aggregation mode is switched to "enabled".

As described above, according to the present exemplary embodiment, in the client environment where the monitoring apparatus 102 is used, the setting of the aggregation mode of the image forming apparatus 103 is rewritten upon a remote instruction. In the case where the proxy information is not the information received from the monitoring apparatus 102, the image forming apparatus 103 ends the processing due to error, determining that the image forming apparatus 103 has tried to connect to the Internet by the communication method used before. Accordingly, it is possible to switch the image forming apparatus 103 to using the proxy information of the monitoring apparatus 102 to aggregate the communications from a certain timing, and to resolve a security issue that some of the image forming apparatuses 103 are connected to the Internet by the communication method used before.

In the client environment where the monitoring apparatus 102 is used, the image forming apparatus 103 is switched to using the proxy information of the monitoring apparatus 102 to aggregate the communications from a certain timing. At that time, according to the present exemplary embodiment, it is possible to resolve the security issue that some of the image forming apparatuses 103 are connected to the Internet by the communication method used before. Further, the image forming apparatus 103 can set the aggregation mode to be "enabled" by using the instruction sheet transmitted from the management server 101 at an activation time of the agent of each of the various kinds of cloud service and an installation time, in addition to an update time of a management list of the image forming apparatus 103. When a contract of a new service for the image forming apparatus 103, which is already under the management of the management server 101 that manages data transmitted from the monitoring apparatus 102, is made, the image forming apparatus 103 can immediately notify the management server 101 of an aggregation state of the communications of the target agent.

In the first exemplary embodiment described above, the description is given of the system where, in the case where the proxy information is not information received from the monitoring apparatus 102, the image forming apparatus 103 ends the communication due to error, determining that the image forming apparatus 103 has tried to connect to the Internet by the communication method used before. However, in the first exemplary embodiment, while it is possible to end the communication due to error from a designated time, it is not possible to notify the management server 101 of communication states of various kinds of agent. Thus, the management server 101 cannot immediately recognize that a certain service in a certain image forming apparatus 103 is not operating normally, and operating costs will increase because, for example, service staff has to visit the client. A second exemplary embodiment resolves this issue by notifying the management server 101 of the communication state via the monitoring apparatus 102 by issuing a trigger for a communication test at the same time as an execution time of the instruction sheet.

<Flowchart of Image Forming Apparatus 103>

Figure 13:
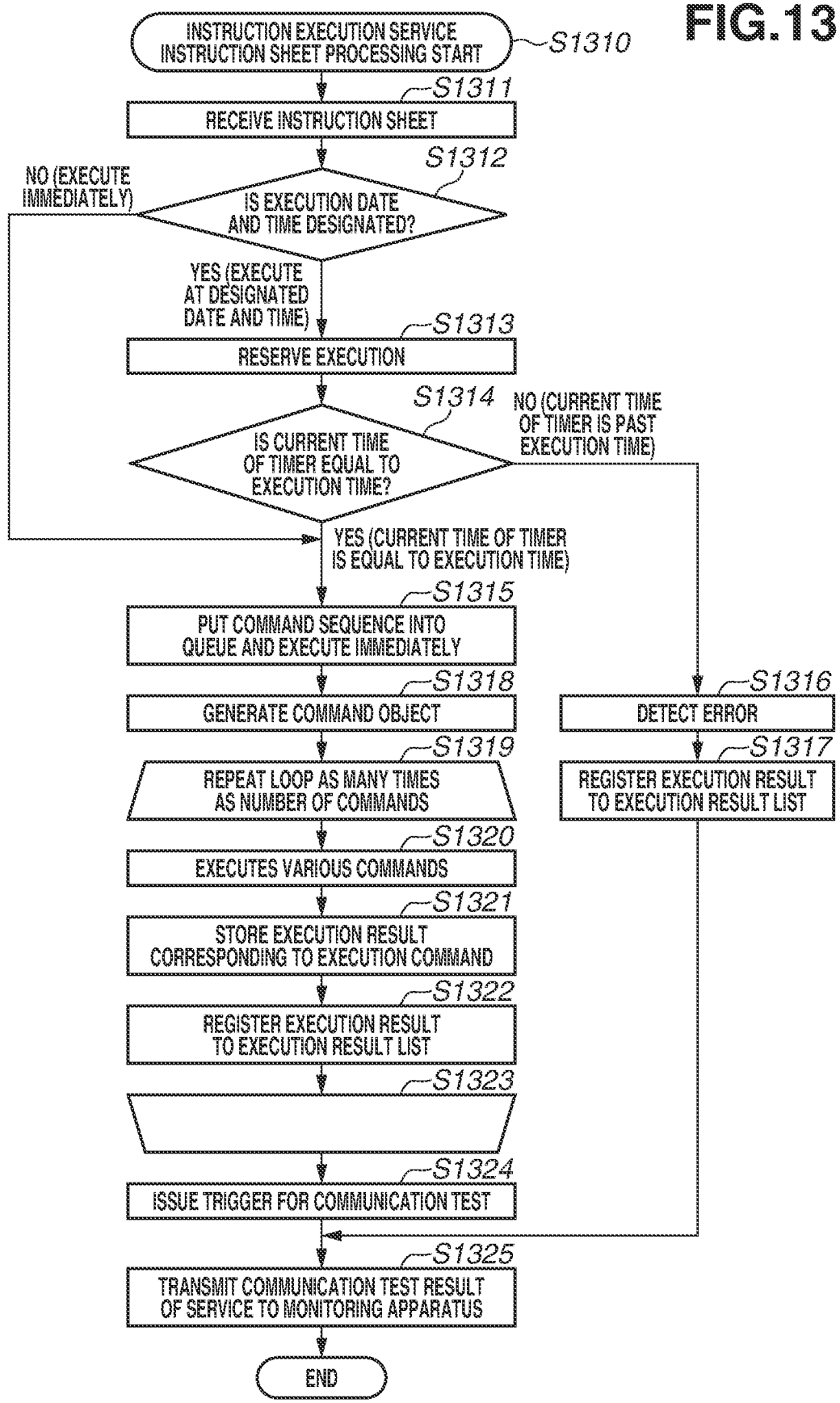
FIG. 13 is a flowchart illustrating an example of operation processing performed by an image forming apparatus.

FIG. 13 is a flowchart illustrating an example of operation processing performed by the image forming apparatus 103 according to the second exemplary embodiment.

Processing in steps S1310 to S1323 is similar to the processing in steps S1110 to S1123 in FIG. 11, and thus descriptions thereof are omitted.

After the processing in steps S1310 to S1323, in step S1324, the sequence control unit 412 issues a trigger for a communication test to the agent of each of the various kinds of service.

In step S1325, the event notification unit 402 receives the trigger, executes the communication test on the monitoring apparatus 102, and transmits the execution result of the communication test to the monitoring apparatus 102. After that, the processing procedure of the event reception unit 503 of the monitoring apparatus 102 after the event reception unit 503 of the monitoring apparatus 102 receives an event of the communication test result from the image forming apparatus 103 is as described based on the flowchart in FIG. 9, and the management server 101 is immediately notified of the communication test result.

As described above, according to the second exemplary embodiment, in the client environment where the monitoring apparatus 102 is used, the image forming apparatus 103 is switched to using the proxy information of the monitoring apparatus 102 to aggregate the communications from a certain timing. In this case, it is possible to resolve the security issue that some of the image forming apparatuses 103 are connected to the Internet by the communication method used before.

Further, the image forming apparatus 103 can perform the processing in FIG. 13 by using the instruction sheet transmitted from the management server 101 at an activation time of the agent of each of the various kinds of cloud service, and an installation time, in addition to an update time of a management list of the devices. A contract of a new service for the image forming apparatus 103, which is already under the management of the management server 101 that manages data transmitted from the monitoring apparatus 102, is made. When the use of the service is started, it is possible to immediately notify the management server 101 of an aggregation state of the target agent.

The present disclosure can be realized by processing of supplying a program for implementing one or more functions of the above-described exemplary embodiments to a system or an apparatus via a network or a storage medium, and one or more processors in the system or the apparatus reading and executing the program. Further, the present disclosure can also be realized by a circuit (e.g., application specific integrated circuits (ASIC)) that can implement one or more functions.

Further, the above-described exemplary embodiments are merely specific examples to implement the present disclosure, and shall not be construed as limiting the technical scope of the present disclosure. Thus, the present disclosure can be implemented in diverse ways as long as it is in accordance with the technological thought or the main features of the present disclosure.

According to the present disclosure, it is possible to enhance the communication security.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-184780, which was filed on Nov. 18, 2022 and which is hereby incorporated by reference herein in its entirety.

What is claimed is:

1. A network device comprising:
   one or more memories; and
   one or more processors, wherein the one or more processors and the one or more memories are configured to:
   obtain proxy information set to as a proxy setting of the network device; and
   communicate with a management server via a proxy server using the obtained proxy information in a case where an aggregation mode is not enabled;
   execute a command for enabling the aggregation mode based on an instruction data received from the management server;
   communicate with the management server via the proxy server using the obtained proxy information in a case where the aggregation mode is enabled and the obtained proxy information is information received from the proxy server, and
   execute a processing that terminates communication with the management server due to an error in a case where the aggregation mode is enabled and the obtained proxy information is not the information received from the proxy server.

2. The network device according to claim 1, wherein the network device is an image forming apparatus.

3. The network device according to claim 1, wherein the one or more processors and the one or more memories are further configured to communicate with the management server not via the proxy server in a case where the proxy information is not set to the network device.

4. The network device according to claim 1, wherein the one or more processors and the one or more memories are further configured to execute a communication test on the proxy server and transmit an execution result of the communication test to the proxy server in a case where the command based on the instruction data is executed.

5. The network device according to claim 1, wherein the one or more processors and the one or more memories are further configured to set, in a case where proxy information is received from the proxy server, the received proxy information to the proxy setting of the network device.

6. The network device according to claim 1, wherein the one or more processors and the one or more memories are further configured to perform registration processing on the management server via the proxy server in a case where an instruction to perform the registration processing is received from the proxy server after the proxy information is set.

7. A processing method for a network device, the method comprising:
   obtaining proxy information set as a proxy setting of the network device;
   communicating with a management server via a proxy server using the obtained proxy information in a case where an aggregation mode is not enabled;
   executing a command for enabling the aggregation mode based on an instruction data received from the management server;
   communicating with the management server via the proxy server using the obtained proxy information in a case where the aggregation mode is enabled and the obtained proxy information is information received from the proxy server; and
   executing a processing that terminates communication with the management server due to an error in a case where the aggregation mode is enabled and the obtained proxy information is not the information received from the proxy server.

* * * * *